United States Patent
Hino et al.

(10) Patent No.: US 9,771,096 B2
(45) Date of Patent: Sep. 26, 2017

(54) RELATIVE ROTATIONAL ANGULAR DISPLACEMENT DETECTION DEVICE, HAVING A MAGNETIC DETECTION UNIT THAT DETECTS A MAGNETIC FLUX OF AN ANNULAR PLANE PORTION FROM A SURFACE OF A RING BODY

(71) Applicant: YAMAHA HATSUDOKI KABUSHIKI KAISHA, Iwata-shi, Shizuoka (JP)

(72) Inventors: Haruyoshi Hino, Iwata (JP); Kazuto Nakamura, Iwata (JP)

(73) Assignee: YAMAHA HATSUDOKI KABUSHIKI KAISHA, Iwata-Shi, Shizuoka (JP)

( * ) Notice: Subject to any disclaimer, the term of this patent is extended or adjusted under 35 U.S.C. 154(b) by 369 days.

(21) Appl. No.: 14/601,222

(22) Filed: Jan. 20, 2015

(65) Prior Publication Data
US 2015/0130389 A1    May 14, 2015

Related U.S. Application Data

(63) Continuation-in-part of application No. PCT/JP2013/074980, filed on Sep. 17, 2013, and a
(Continued)

(30) Foreign Application Priority Data

Sep. 14, 2012    (JP) .................................. 2012-202935

(51) Int. Cl.
*G01L 3/00*    (2006.01)
*B62D 5/04*    (2006.01)
(Continued)

(52) U.S. Cl.
CPC ............... *B62D 5/046* (2013.01); *A61G 5/04* (2013.01); *B62M 6/50* (2013.01); *G01D 5/2451* (2013.01); *G01L 3/1435* (2013.01); *G05B 11/011* (2013.01)

(58) Field of Classification Search
CPC . G01B 7/30; A61G 5/04; B62D 5/046; G05B 11/011; B62M 6/50; G01D 5/145;
(Continued)

(56) References Cited

U.S. PATENT DOCUMENTS 6,765,323 B2 *    7/2004    Takano ............... B60L 11/1801
310/68 B
2004/0194560 A1    10/2004    Froehlich et al.
(Continued)

FOREIGN PATENT DOCUMENTS

CN    1205432 A    1/1999
CN    102032863 A    4/2011
(Continued)

OTHER PUBLICATIONS (Hirose Muneto, ; Sasanouchi Kiyotaka), Rotational Torque Detection Device, JP2011043398 Mar. 3, 2011.*
(Continued)

*Primary Examiner* — Harshad R Patel
*Assistant Examiner* — Brandi Hopkins
(74) *Attorney, Agent, or Firm* — Rabin & Berdo, P.C.

(57) ABSTRACT

A relative rotational angular displacement detection device includes a pair of rotatable members rotatable relative to each other in a circumferential direction. A permanent magnet is attached to one of the rotatable members and includes magnetic poles magnetized in an axial direction of the axis of rotation and arranged to alternate in polarity in the circumferential direction. A magnetic flux guiding ring includes an annular ring body attached to the other of the
(Continued)

rotatable members and is arranged coaxially with the axis of rotation, and a plurality of protruding portions each having a circumferential width smaller than the circumferential width of the magnetic pole. A magnetic detection unit is configured to detect magnetic fluxes of the ring body of the magnetic flux guiding ring. The magnetic flux guiding ring is magnetized depending on the positions of the protruding portions relative to the positions of the magnetic poles.

20 Claims, 15 Drawing Sheets

Related U.S. Application Data continuation-in-part of application No. 14/024,167, filed on Sep. 11, 2013, now abandoned.

(51) Int. Cl.
    *G05B 11/01*     (2006.01)
    *A61G 5/04*     (2013.01)
    *B62M 6/50*     (2010.01)
    *G01D 5/245*     (2006.01)
    *G01L 3/14*     (2006.01)

(58) Field of Classification Search
    CPC ...... B60S 1/08; B60S 1/166; Y10T 74/19833; H02K 11/215; H02K 2211/03; H02K 7/1166; G01L 3/104
    USPC .................................................... 73/862.325
    See application file for complete search history.

(56) References Cited

U.S. PATENT DOCUMENTS

| | | |
|---|---|---|
| 2008/0218160 A1 | 9/2008 | Tsuchida et al. |
| 2011/0068780 A1 | 3/2011 | Sakai |

FOREIGN PATENT DOCUMENTS

| | | |
|---|---|---|
| CN | 201914313 U | 8/2011 |
| CN | 103673868 A | 3/2014 |
| DE | 102012110617 A1 | 5/2013 |
| EP | 0891923 A2 | 1/1999 |
| EP | 1503183 A1 | 2/2005 |
| EP | H11-30555 A | 2/2005 |
| JP | 2004-309463 A | 11/2004 |
| JP | 2008-189164 A | 8/2008 |
| JP | 2008-189164 A | 8/2008 |
| JP | 2008-216172 A | 9/2008 |
| JP | 2008-249366 A | 10/2008 |
| JP | 2009-522569 A | 6/2009 |
| JP | 2010-181310 A | 8/2010 |
| JP | 2010-185815 A | 8/2010 |
| JP | 2010-243407 A | 10/2010 |
| JP | 2011-043398 A | 3/2011 |
| JP | 2011-043398 A | 3/2011 |
| WO | WO-2007/139021 A1 | 12/2007 |
| WO | WO 2007-139021 A1 | 12/2007 |

OTHER PUBLICATIONS

Extended European Search Report dated Jun. 24, 2015.
Chinese Office Action from a corresponding Chinese Application mailed on Oct. 29, 2015.
Taiwanese Office Action of counterpart application. Dec. 5, 2014.

\* cited by examiner

RELATIVE ROTATIONAL ANGULAR DISPLACEMENT DETECTION DEVICE, HAVING A MAGNETIC DETECTION UNIT THAT DETECTS A MAGNETIC FLUX OF AN ANNULAR PLANE PORTION FROM A SURFACE OF A RING BODY

CROSS-REFERENCE TO RELATED APPLICATIONS

This is a continuation-in-part of U.S. application Ser. No. 14/024,167, filed Sep. 11, 2013, which claimed priority under 35 U.S.C. §119 to Japanese Patent Application No. 2012-202935 filed on Sep. 14, 2012, and PCT Patent Application No. PCT/JP2013/074980 filed on Sep. 17, 2013, the subject matter of which is incorporated herein by reference.

BACKGROUND OF THE INVENTION

Field of the Invention

The present invention relates to, inter alia, a relative rotational angular displacement detection device used to detect a relative rotational angular displacement of a pair of rotatable members arranged coaxially with each other.

More specifically, the present invention relates to a relative rotational angular displacement detection device preferably for use in a power assist system for, e.g., a power assist wheelchair, a power assist bicycle, a power steering wheel, etc. The present invention also relates to a torque detection device including the relative rotational angular displacement detection device, and a torque control device including the relative rotational angular displacement detection device. It also relates to a power assist wheelchair, a power assist straddle-type vehicle, and a power steering device equipped with the torque control device.

Description of the Related Art

For example, in a conventional manual wheelchair, a pair of hand rims are arranged outside of a pair of right and left rear wheels, respectively, and coaxially connected thereto. When a user rotates the hand rim, the rotational force is transmitted to the wheel to move the wheelchair. In recent years, for the purpose of reducing the burden of moving the hand rim by a user, a power assist system has been developed, in which the most appropriate assisting force corresponding to the manual force for moving the hand rim is transmitted to a driving wheel by an electric motor.

According to this system, the manual force for moving the hand rim of the wheelchair and the rotational force of the electric motor outputted in accordance with the manual force are combined to rotate the wheels, which enables easy moving of the wheelchair. This kind of power assist system can be applied not only to a wheelchair but also to a power assist bicycle, a power steering device of an automobile, etc.

This kind of power assist system is provided with a detection device for sensing a torque by detecting a relative rotational angular displacement of a pair of rotatable members coaxially arranged with each other in a relatively rotatable manner. As a device for detecting such a relative rotational angular displacement or a relative rotational torque, Japanese Unexamined Laid-open Patent Application Publication No. 2008-249366 discloses the following device. The device includes a pair of first and second shaft members arranged coaxially with each other, a cylindrical magnet fixed to the first shaft member, a pair of yoke rings fixed to the second shaft member, a pair of magnetic flux collector rings each arranged so as to surround each yoke ring and each having a magnetic flux collecting projection, and a magnetic sensor arranged between the magnetic flux collecting projections and configured to detect magnetic flux changes occurring in the yoke rings in accordance with the relative angular displacements of the first and second shaft members.

In the relative rotational angular displacement detection device, the first shaft member is coaxially provided with the cylindrical magnet so as to rotate together with the first shaft member. The cylindrical magnet includes magnetic poles, i.e., N-poles and S-poles, magnetized in a radial direction of an axis of rotation and arranged alternately in a circumferential direction of the axis of rotation. The second shaft member is provided with the pair of yoke rings which rotate together with the second shaft member. Each yoke ring includes triangular shaped magnetic pole claws corresponding to the N-poles and S-poles.

Each magnetic pole claw is arranged outside of the cylindrical magnet so as to face the pole of the cylindrical magnet in the radial direction of the axis of rotation. The pair of yoke rings are arranged such that the magnetic pole claws of one of the yoke rings and the magnetic pole claws of the other of the yoke rings are arranged so as to oppose in an axial direction of the axis of rotation and arranged alternately in the circumferential direction. A pair of magnetic flux collector rings each for collecting the magnetic fluxes generated in each yoke ring are arranged radially outside of the corresponding yoke rings.

When the first shaft member and the second shaft member are relatively rotated, the position of each yoke ring relative to the magnetic pole of the cylindrical magnet is changed. This causes magnetic flux changes between the magnetic flux collector rings. The magnetic flux changes are detected by the magnetic sensor.

SUMMARY OF THE INVENTION

In the aforementioned detection device, in order to detect the magnetic flux changes with a higher degree of accuracy, it is necessary to arrange the pair of yoke rings so that the triangular shaped magnetic pole claws formed on the pair of yoke rings are closely arranged alternately in the circumferential direction with the circumferential distance of the adjacent magnetic pole claws kept constant and with the axial distance of the opposing magnetic pole claws kept constant. Furthermore, it was necessary to arrange the magnetic pole claws so that the gap between each magnetic pole claw and the cylindrical magnet is kept constant in the radial direction. This requires a high dimensional accuracy of each yoke ring in the circumferential direction, in the axial direction and in the radial direction, and also requires a high assembly accuracy of the yoke rings and the cylindrical magnet. Thus, to increase the detection accuracy, the cost for manufacturing and assembling the detection device is increased.

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a relative rotational angular displacement detection device simple in structure and simple in assembly work and capable of detecting a relative rotational angular displacement of a pair of rotatable members arranged coaxially with each other with a high degree of accuracy.

Among other potential advantages, some embodiments can provide a torque detection device including the relative rotational angular displacement detection device, and a torque control device including the relative rotational angular displacement detection device.

Among other potential advantages, some embodiments can provide a power assist wheelchair, a power assist straddle-type vehicle, and a power steering device equipped with the torque control device.

Other objects and advantages of the present invention will be apparent from the following preferred embodiments.

According to some embodiments of the present invention, a relative rotational angular displacement detection device is equipped with a pair of rotatable members, a permanent magnet, a magnetic flux guiding ring, and a magnetic detection unit.

The relative rotational angular displacement detection device includes a pair of rotatable members relatively rotatable in a circumferential direction of an axis of rotation, and a permanent magnet attached to one of the pair of rotatable members and including magnetic poles magnetized in an axial direction of the axis of rotation and arranged so as to alternate in polarity in the circumferential direction of the axis of rotation.

The device further includes a magnetic flux guiding ring including an annular ring body attached to the other of the pair of rotatable members and arranged coaxially with the axis of rotation and a plurality of protruding portions each having a circumferential width smaller than a circumferential width of each magnetic pole.

The device further includes a magnetic detection unit for detecting magnetic fluxes of the ring body of the magnetic flux guiding ring magnetized depending on a relative position of each protruding portion of the magnetic flux guiding ring and each magnetic pole of the permanent magnet.

In some exemplary embodiments of the relative rotational angular displacement detection device, the ring body of the magnetic flux guiding ring includes an annular plane portion extending in a direction intersecting with a magnetization direction of the permanent magnet, and the magnetic detection unit is configured to detect magnetic fluxes of the annular plane portion of the ring body. By constituting such that the permanent magnet is magnetized in the axial direction of the axis of rotation, the protruding portions of the magnetic flux guiding ring are arranged so as to face the permanent magnet with a gap in the axial direction of the axis of rotation, and the ring body includes the annular plane portion extending in a direction intersecting with the magnetization direction of the permanent magnet, the magnetic flux guiding ring can be produced with a high degree of accuracy. Further, by constituting such that the magnetic detection unit detects the magnetic fluxes of the annular plane portion of the ring body of the magnetic flux guiding ring, the detection accuracy can be enhanced.

In some exemplary embodiments of the relative rotational angular displacement detection device, the magnetic detection unit includes a magnetic sensor for detecting magnetic fluxes, and the magnetic sensor is a sensor for detecting magnetic fluxes in the magnetization direction of the permanent magnet among magnetic fluxes of the annular plane portion. By constituting such that the permanent magnet is magnetized in the axial direction of the axis of rotation, the protruding portions of the magnetic flux guiding ring are arranged so as to face the permanent magnet with a gap in the axial direction of the axis of rotation, the ring body includes the annular plane portion extending in a direction intersecting with the magnetization direction of the permanent magnet, and the magnetic sensor is a sensor for detecting magnetic fluxes in the magnetization direction of the permanent magnet among magnetic fluxes of the annular plane portion, the relative rotational angular displacement detection device can be produced with a high degree of accuracy. Further, the detection accuracy can be improved.

In some exemplary embodiments of the relative rotational angular displacement detection device, at least one of the ring body of the magnetic flux guiding ring and the magnetic sensor is arranged at a position different in an axial direction of the axis of rotation from the position of the protruding portion of the magnetic flux guiding ring. By employing the structure for defining the relative position in the axial direction of the axis of rotation or the structure in which at least one of the ring body of the magnetic flux guiding ring and the magnetic sensor is arranged at a position different in an axial direction of the axis of rotation from the position of the protruding portion of the magnetic flux guiding ring, the relative rotational angular displacement detection device can be produced with a high degree of accuracy, which in turn can improve the detection accuracy.

In some exemplary embodiments of the relative rotational angular displacement detection device, the magnetic detection unit includes an intermediate yoke having a first plane portion, and the first plane portion is arranged between the magnetic sensor and the ring body and arranged so as to face the annular plane portion of the ring body with a gap in the magnetization direction of the permanent magnet.

In some exemplary embodiments of the relative rotational angular displacement detection device, an area of the first plane portion of the intermediate yoke is smaller than an area of the annular plane portion of the ring body.

In some exemplary embodiments of the relative rotational angular displacement detection device, at least one of the ring body, the intermediate yoke and the magnetic sensor is arranged at a position different in a radial direction of the axis of rotation from the position of the protruding portion of the magnetic flux guiding ring.

According to other embodiments of the present invention, a torque detection device equipped with one of the aforementioned relative rotational angular displacement detection devices includes an elastic member arranged between the pair of rotatable members. A biasing force is always applied to the pair of rotatable members by the elastic member in a relative rotation direction. The pair of rotatable members includes a relative rotation restriction part configured to prevent a relative rotation of the pair of rotatable members after one of the pair of rotatable members is relatively rotated against the biasing force of the elastic member by a certain angle relative to the other of the pair of rotatable members.

According to still other embodiments of the present invention, a torque control device equipped with one of the aforementioned relative rotational angular displacement detection devices includes a rotation driving member attached to one of the pair of rotatable members, a rotation force beings given to the rotation driving member by a use, a power source configured to give a rotation force to the other of the pair of rotatable members, and a control unit configured to control a rotation force given to the other of the pair of rotatable members by the power source depending on an output of the magnetic detection unit when the one of the pair of rotatable members is relatively rotated by a certain rotational angle relative to the other of the pair of rotatable members. Here, it should be understood that the wordings of "one of the pair of rotatable members" and "the other of the pair of rotatable member" mentioned here can be the same as or different from the previously mentioned wordings of "one of the pair of rotatable members" and "the other of the pair of rotatable member."

According to still other embodiments of the present invention, a power assist wheelchair equipped with the torque control device can be provided.

According to still other embodiments of the present invention, a power assist straddle-type vehicle equipped with the torque control device can be provided.

According to some exemplary embodiments of the present invention, a power steering device equipped with the torque control device can be provided.

According to some exemplary embodiments of the present invention, the permanent magnet is attached to one of the pair of rotatable members relatively rotatable in the circumferential direction of the axis of rotation so that the magnetic poles magnetized in the axial direction of the axis of rotation are arranged so as to alternate in polarity in the circumferential direction of the axis of rotation, the plurality of protruding portions of the magnetic flux guiding ring are arranged so as to face the permanent magnet with a gap in the axial direction of the axis of rotation, and the protruding portion has a circumferential width smaller than a circumferential width of each magnetic pole. Therefore, the protruding portion of the magnetic flux guiding ring can be formed into a simple shape, which in turn can produce the magnetic flux guiding ring with a high degree of accuracy. Further, since the plurality of protruding portions of the magnetic flux guiding ring are arranged so as to face the permanent magnet via a gap in the axial direction of the axis of rotation, the relative position relative to the permanent magnet can be determined only by the gap in the axial direction. This enables high-precision assembly. Therefore, a relative rotational angular displacement of the pair of rotatable members which are relatively rotatable can be detected with a high degree of accuracy.

BRIEF EXPLANATION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the present invention will be described with reference to the attached drawings by way of example and not limitation. It should be understood based on this disclosure that various other modifications can be made by those in the art based on these illustrated embodiments.

Figure 8:
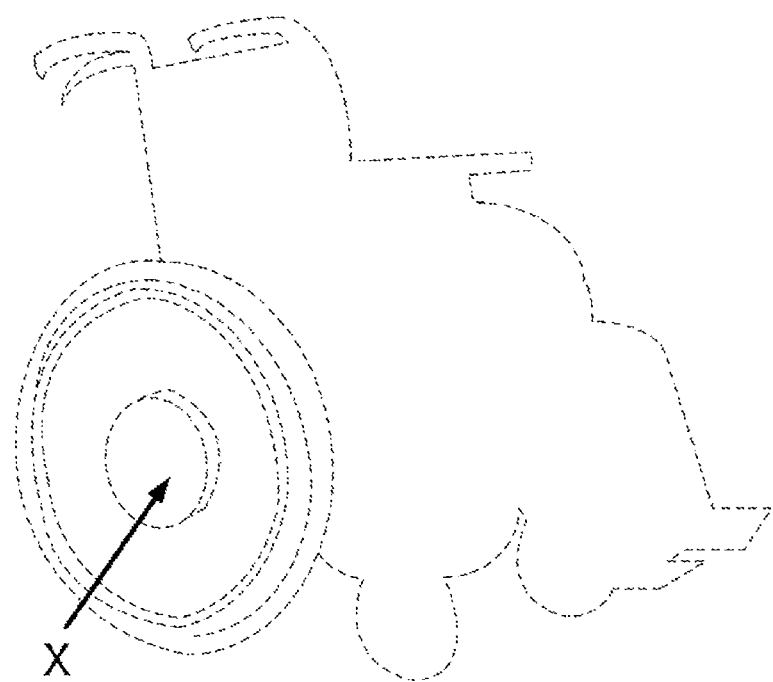
FIG. 8 is a schematic explanatory view showing a relative rotational angular displacement device according to the present invention applied to a power assist system for a power assist wheelchair.
Figure 9:
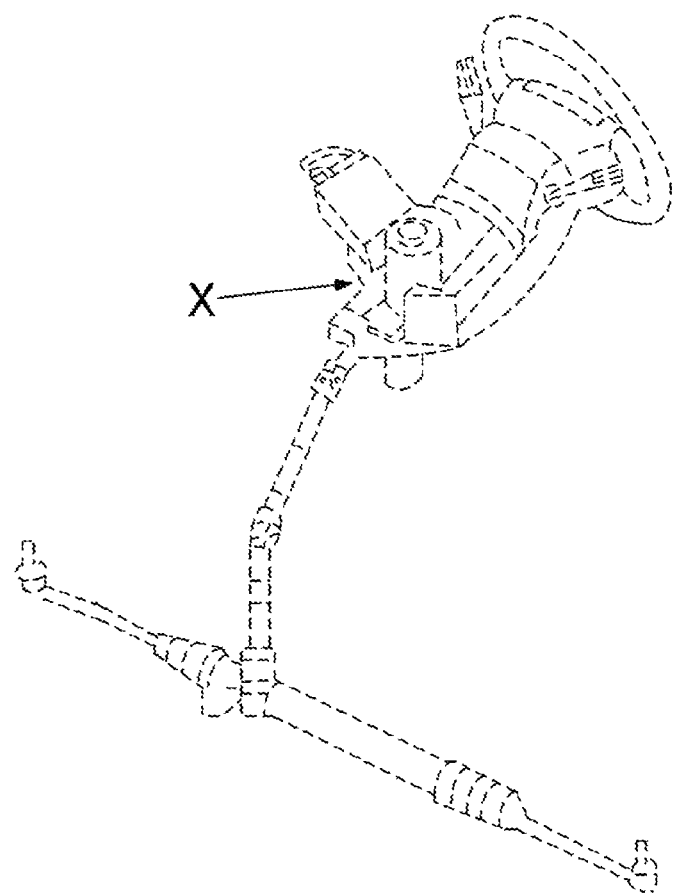
FIG. 9 is a schematic explanatory view showing a relative rotational angular displacement device according to the present invention applied to a power assist system for a power steering device.

Hereinafter, an embodiment of the present invention in which a relative rotational angular displacement detection device according to the present invention is applied to a power assist system X for a power assist bicycle (see FIG. 7) will be explained with reference to the attached drawings. Needless to say, the relative rotational angular displacement detection device according to the present invention is not limited to the case in which the device is used in a power assist system for a power assist bicycle, and can also be applied to various devices and mechanisms for detecting a relative rotational angular displacement of a pair of rotatable members which are movable relatively. For example, the present invention can also be preferably applied to, e.g., a power assist system X for a power assist wheelchair (see FIG. 8), a power steering device for an automobile (see FIG. 9), etc.

Figure 1:
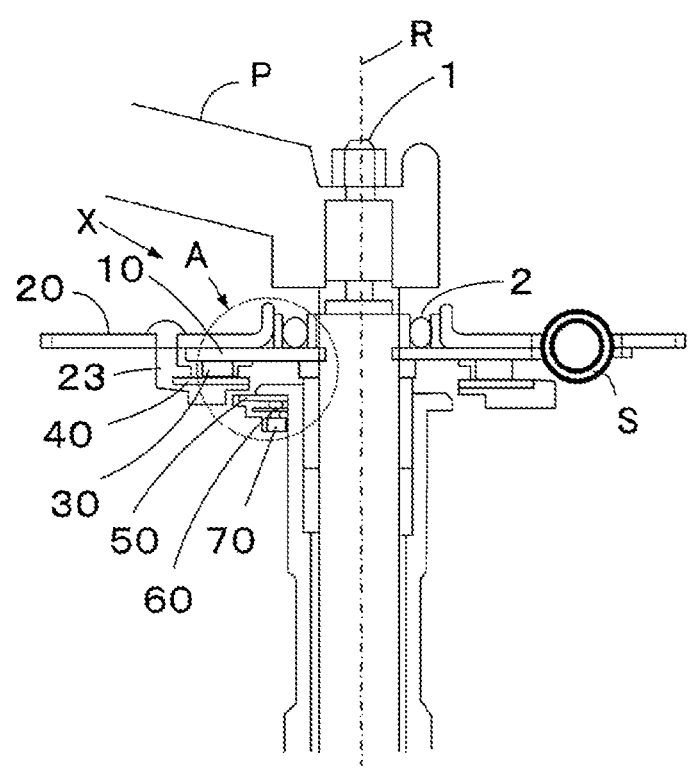
FIG. 1 is an explanatory view showing a schematic structure of a relative rotational angular displacement detection device according to an embodiment of the present invention.
Figure 7:
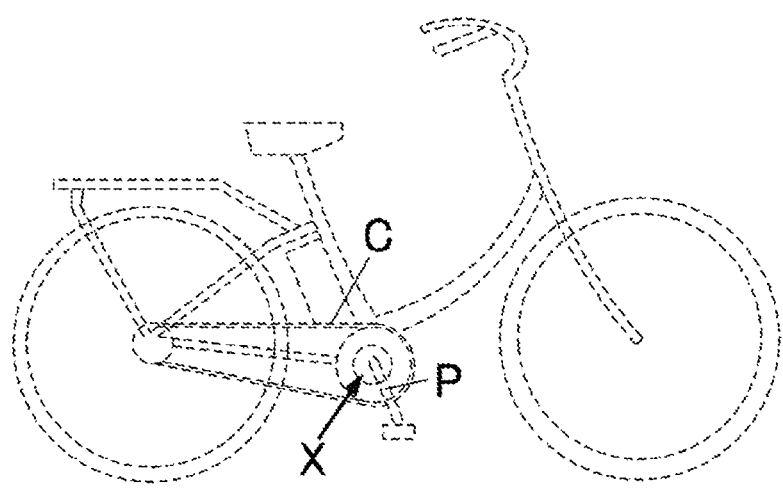
FIG. 7 is a schematic explanatory view showing a relative rotational angular displacement device according to the present invention applied to a power assist system for a power assist bicycle.

As shown in FIGS. 1 and 7 for example, in the relative rotational angular displacement device X according to the embodiment, a pedal P is attached to one end of a shaft part 1. A lever member 10 as a first rotatable member and a sprocket 20 as a second rotatable member are arranged coaxially with the shaft part 1, i.e., arranged coaxially with the axis R of rotation. As shown in this figure, the lever member 10 and the sprocket 20 are arranged close to each other in an adjacent manner so as to be relatively rotatable in the circumferential direction of the axis R of rotation. The circumferential direction of the axis R of rotation may also mean a rotational direction that the lever member 10 and sprocket 20 rotate about the axis R. The circumferential direction of the axis R of rotation may also be the same as a rotational direction of the lever member 10 and the sprocket 20.

Figure 3A:
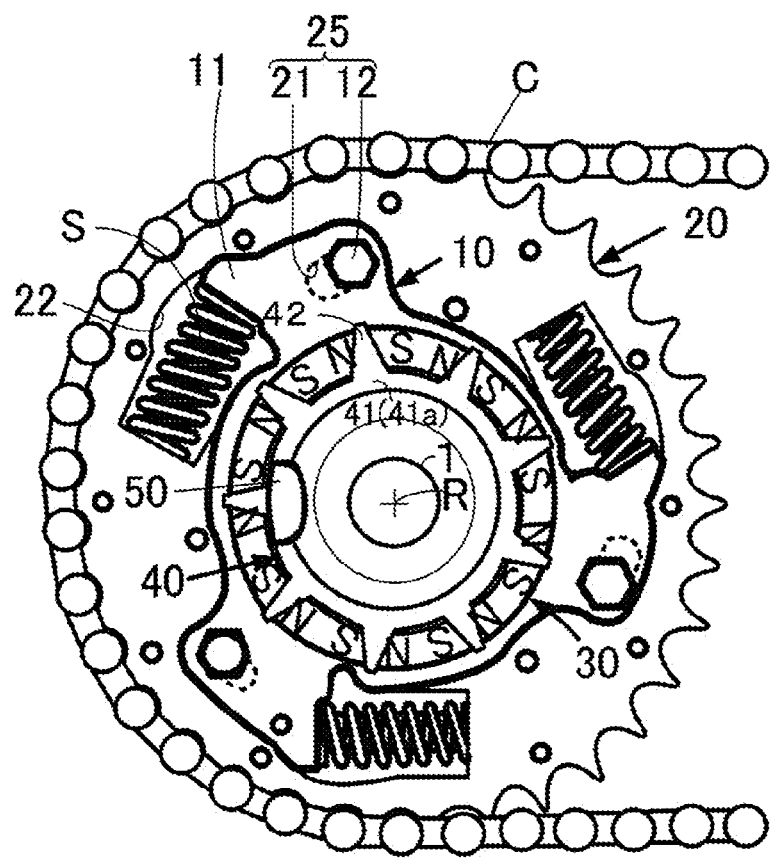
FIG. 3A is a schematic structural view of a principal part of the aforementioned device as seen in an axial direction of an axis of rotation in a state in which the relative rotational angular displacement is zero degree.

As shown in FIG. 3A, the lever member 10 as a first rotatable member is integrally provided with three engaging portions 11 extending radially outward of the shaft part 1, and is configured to rotate together with the shaft part 1 along with the rotation of the pedal P. On the other hand, as shown in FIG. 1, the sprocket 20 as a second rotatable member is arranged coaxially with the shaft part 1 via a bearing 2 in a relatively rotatable manner relative to the lever member 10 as a first rotatable member.

As shown in FIG. 3A, each engaging portion 11 of the lever member 10 is provided with an engaging projecting portion 12 protruded in an axially outward direction, i.e., protruded toward the sprocket 20. Engaging projecting portion 12 is fitted in an arc-shaped slit 21 formed in the sprocket 20. The slit 21 extends in the circumferential direction. This engaging projecting portion 12 is slidably movable within a range of the circumferential length of the slit 21 along with the rotational movement of the lever member 10. The engaging projecting portion 12 and the slit 21 constitute a relative rotation restriction part 25 which restricts the relative rotation of the lever member 10 as a first rotatable member and the sprocket 20 as a second rotatable member. The lever member 10 and the sprocket 20 are rotatable relative to each other within an angular range of less than one rotation (360 degrees), for example.

In the sprocket 20, spring mounting holes 22 each for mounting a coil spring S are formed at three circumferential positions. In each spring mounting hole 22, a coil spring S is mounted. One end portion of this coil spring S is engaged with one circumferential end portion of the spring mounting hole 22, and the other end portion thereof is engaged with the engaging portion 11 of the lever member 10, so that the engaging portion 11 of the lever member 10 is biased by the spring S in the circumferential direction (in the clockwise direction in FIG. 3A). In a state in which no rotational force is applied to the pedal P by a user, the engaging projecting portion 12 provided at each engaging portion 11 of the lever member 10 is engaged with one circumferential end of each slit 21.

Figure 3B:
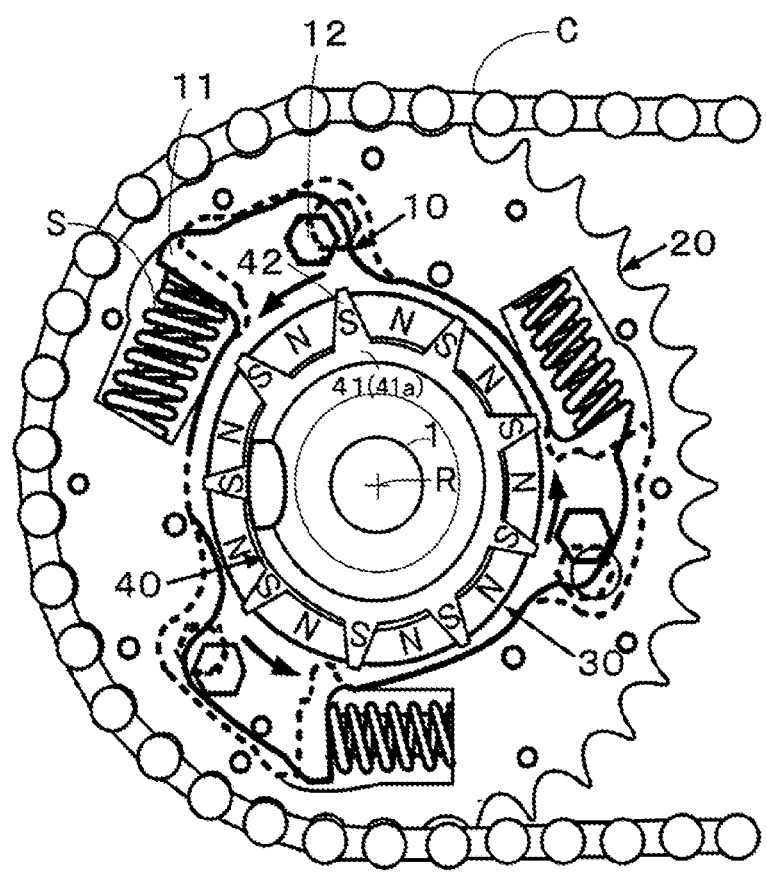
FIG. 3B is a schematic structural view of a principal part of the aforementioned device as seen in the axial direction of the axis of rotation in a state in which the relative rotational angular displacement is ten degrees.

Accordingly, from the state shown in FIG. 3A, when a rotational force is applied to the pedal P in a counterclockwise direction, the shaft part 1 connected to the pedal P rotates as shown in FIG. 3B. Along with the rotation of the pedal P, the rotational force is given to the lever member 10 fixed to the shaft part 1, resulting in a rotation of the lever member 10 in the counterclockwise direction. When the lever member 10 rotates in the counterclockwise direction, the engaging portion 11 rotates relative to the sprocket 20 while pushing against the biasing force of the spring S mounted on the sprocket 20. At this time, the engaging projecting portion 12 provided at the engaging portion 11 of the lever member 10 moves in the circumferential direction (in the counterclockwise direction) in the slit 21 formed in the sprocket 20.

When the engaging projecting portion 12 provided at the engaging portion 11 of the lever member 10 reaches the other circumferential end of the slit 21, the engaging projecting portion 12 is engaged with the other circumferential end of the slit 21. Therefore, the sprocket 20 thereafter rotates in the counterclockwise direction together with the lever member 10 along with the rotation of the lever member 10. Even until the engaging projecting portion 12 reaches the other circumferential end of the slit 21, the sprocket 20 rotates in the counterclockwise direction by the biasing force of the spring S.

As explained above, in this embodiment, the lever member 10 as a first rotatable member and the sprocket 20 as a second rotatable member are relatively movable within a certain range in the circumferential direction of the shaft part 1, i.e., within a range of the circumferential length of the slit 21 formed in the sprocket 20. By detecting the relative rotational angular displacement of the rotatable members 10 and 20 within the limited relative rotational range in the circumferential direction, in other words, the relative rotational torque, an electric motor (not illustrated) is controlled, so that a rotational force given to the pedal P and a rotational force of the electric motor outputted in accordance with the rotational force are combined to thereby control a rotational force of a rear wheel via a chain C engaged with the sprocket 20 (see FIG. 7).

Figure 2:
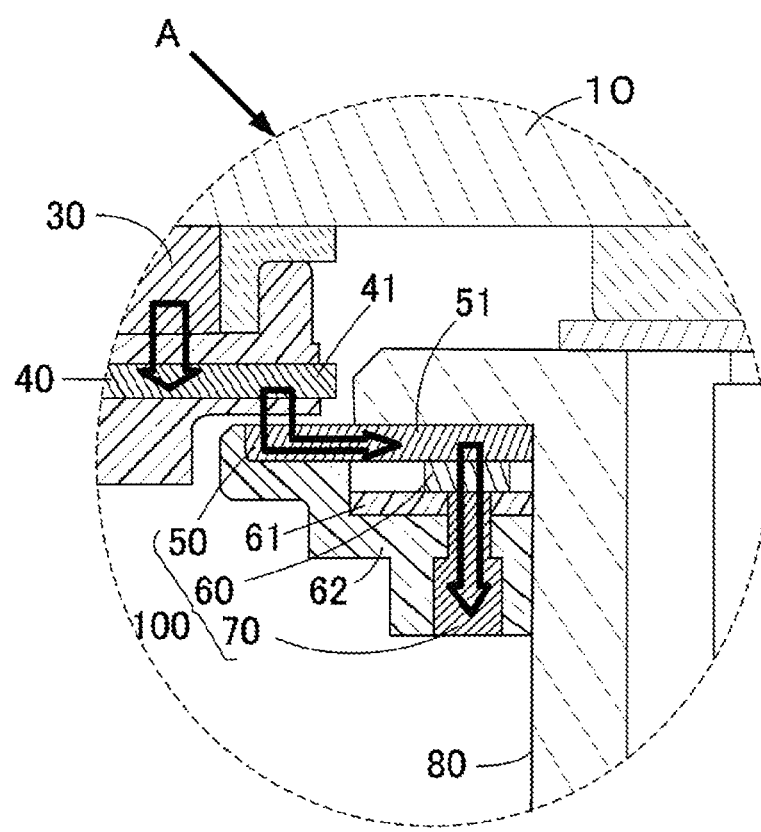
FIG. 2 is an enlarged cross-sectional view showing a portion "A" surrounded by a dash line in FIG. 1.

In order to detect the relative rotational angular displacement of the lever member 10 as a first rotatable member and the sprocket 20 as a second rotatable member, in this embodiment, as shown in FIGS. 1 to 3, the device includes, as main structural members, a permanent magnet 30, a magnetic flux guiding ring 40, and a magnetic detection unit 100.

The permanent magnet 30 is an annular or ring-shaped magnet, such as, e.g., an annular or ring-shaped bond magnet, arranged coaxially with the axis R of rotation, or coaxially arranged with the shaft part 1 as shown in FIG. 3A, in which the magnetic poles, i.e., N-poles and S-poles, are arranged alternately in the circumferential direction of the shaft part 1. Each magnetic pole is magnetized in the axial direction of the shaft part 1, i.e., in a direction parallel to the axial direction of the axis R of rotation. It should be noted, however, that it is not always required that the magnetization direction is in completely parallel with the axial direction of the axis R of rotation but can be inclined within a range of 45 degrees relative to the axial direction.

In this embodiment, nine pairs of magnetic poles (a total of 18 magnetic poles, nine S-poles and nine N-poles) are arranged at equal intervals in the circumferential direction. This annular or ring-shaped permanent magnet 30 is arranged coaxially with the lever member 10 and fixed to the lever member 10, so that the permanent magnet 30 rotates along with the rotation of the lever member 10. It should be noted, however, that in the present invention the permanent magnet 30 is not limited to the aforementioned annular or ring-shaped permanent magnet, but can be constituted by a plurality of separate permanent magnets arranged at equal intervals in the circumferential direction. Further, the permanent magnet 30 can be either a sintered magnet or a bond magnet, and also can be either an isotropic magnet or an anisotropic magnet. Further, the permanent magnet 30 can be a polar anisotropic magnet.

The magnetic flux guiding ring 40 is, as shown in FIGS. 1 to 3, arranged coaxially with the sprocket 20. The magnetic flux guiding ring 40 includes an annular ring body 41 and a plurality of protruding portions 42 protruded in a radially outward direction from the outer peripheral edge of the ring body 41. The ring body 41 is arranged so as not to overlap the permanent magnet 30 in the radial direction of the shaft part 1. In other words, the ring body 41 is arranged so as not to overlap the permanent magnet 30 when seen in the axial direction of the shaft part 1. The plurality of protruding portions 42 are arranged so as to overlap the permanent magnet 30 in the radial direction. In other words, the plurality of protruding portions 42 overlaps the permanent magnet 30 when seen in the axial direction of the shaft part 1.

The number of protruding portions 42 is equal to the number of pairs of magnetic poles of the permanent magnet 30. Each protruding portion 42 has a circumferential width W1 smaller than a circumferential width W2 of each magnetic pole. More specifically, the ring body 41 of the magnetic flux guiding ring 40 is provided with an annular plane portion 41*a* extending in a direction intersecting with the magnetization direction of the permanent magnet 30, i.e., extending in a radial direction of the shaft part 1. On the other hand, each protruding portion 42 of the magnetic flux guiding ring 40 is formed into a tapered triangular shape or a trapezoidal shape with the width decreasing toward the radially outward direction (see FIGS. 4A and 4B). As shown in FIG. 1, this magnetic flux guiding ring 40 is integrally secured to the sprocket 20 via an attachment 23 in a state in which the ring 40 is detached from the sprocket 20 in the axial direction. That is, the magnetic flux guiding ring 40 is configured to integrally rotate with the sprocket 20.

In this embodiment, it is exemplified that each protruding portion 42 of the magnetic flux guiding ring 40 extends in a radially outward direction. However, the protruding portion 42 of the magnetic flux guiding ring 40 is not limited to it. For example, the protruding portion 42 of the magnetic flux guiding ring 40 can be a protruding portion extending in a radially inward direction. That is, it can be configured such that the ring body 41 is arranged radially outward of the annular permanent magnet 30 and the protruding portions 42 extend from the ring body 41 in a radially inward direction.

The magnetic flux guiding ring 40 can be preferably produced by punching a steel plate, etc., but the magnetic flux guiding ring 40 can be constituted by connecting a plurality of members. Further, in this embodiment, it is exemplified that the magnetic flux guiding ring 40 includes the ring body 41 and protruding portions 42 that are formed on the same plane, but not limited to it. For example, the protruding portion 42 can be formed into a shape bent at a certain angle relative to the ring body 41.

Each protruding portion 42 of the magnetic flux guiding ring 40 is positioned in between the S-pole and the N-pole of the permanent magnet 30 in an initial state in which no external force is applied to the shaft part 1 as shown in FIG. 3A. When an external force is applied to the shaft part 1 from the initial state, the lever member 10 rotates. Along with the rotation, the lever member 10 is displaced or rotated relative to the sprocket 20. At this time, the engaging projecting portion 12 provided at the engaging portion 11 of the lever member 10 moves along the slit 21 formed in the sprocket 20. The engaging projecting portion 12 of the lever member 10 moves along the slit 21 until the engaging projecting portion 12 is engaged with the other circumferential end of the slit 21 and the relative movement of the engaging projecting portion 12 relative to the sprocket 20 is limited.

In a state in which the engaging projecting portion 12 of the lever member 10 is moved and engaged with the other circumferential end of the slit 21, as shown in FIG. 3B, all of the protruding portions 42 of the magnetic flux guiding ring 40 are positioned so that the overlapping area of the protruding portion 42 and the S-pole of the permanent magnet 30 becomes large.

The magnetic detection unit 100 is configured to detect the magnetic fluxes of the ring body 41 of the magnetic flux guiding ring 40 magnetized depending on the relative position of the protruding portion 42 of the magnetic flux guiding ring 40 and the magnetic pole of the permanent magnet 30. As shown in FIG. 2, the magnetic detection unit 100 includes an intermediate yoke 50, a magnetic sensor 60, and a back yoke 70.

The intermediate yoke 50 includes a first plane portion 51 as shown in FIG. 2. This first plane portion 51 is arranged close to the magnetic flux guiding ring 40 via a certain gap in a state in which a portion (the radially outward portion) of the first plane portion 51 overlaps the ring body 41 of the magnetic flux guiding ring 40 in the radial direction of the ring body 41, i.e., the radially outward portion of the first plane portion 51 overlaps the ring body 41 when seen in the axial direction of the shaft part 1. The first plane portion 51 is arranged with a gap ensured between the first plane portion 51 and the ring body 41 of the magnetic flux guiding ring 40. To be more specific, the first plane portion 51 faces the ring body 41 of the magnetic flux guiding ring 40 across the gap with respect to the axial direction of the axis R of rotation.

This intermediate yoke 50 is made of a ferromagnetic substance, such as, e.g., iron, and configured to collect the magnetic fluxes of the magnetic flux guiding ring 40 magnetized by the permanent magnet 30 and also to average the amplitude of the magnetic fluxes. The area of the first plane portion 51 of the intermediate yoke 50 is smaller than the area of the annular plane portion 41*a* of the ring body 41.

The magnetic sensor 60 is an element for detecting the magnetic fluxes passing through the intermediate yoke 50 and is arranged to overlap the intermediate yoke 50 in the radial direction, i.e., arranged to overlap the intermediate yoke 50 when seen in the axial direction of the shaft part 1 as shown in FIGS. 1 and 2. As the magnetic sensor 60, for example, a Hall element (Hall IC) can be preferably used. As shown in FIG. 2, the magnetic sensor 60 is attached to a resin base plate 61 and fixed to a vehicle side non-rotatable member 80 via a base plate holder 62. The non-rotatable member 80 does not rotate together with the first rotatable member 10 and the second rotatable member 20.

The back yoke 70 is made of a ferromagnetic substance, such as, e.g., iron, and is integrally embedded in the base plate holder 62. This back yoke 70 is arranged close to the magnetic sensor 60 in a manner such that the back yoke 70 overlaps the magnetic sensor 60 in the radial direction, i.e., the back yoke 70 overlaps the magnetic sensor 60 when seen in the axial direction of the shaft part 1.

In detail, the intermediate yoke 50, the magnetic sensor 60 and the back yoke 70 are integrated so as to overlap with each other when seen in the axial direction of the shaft part 1, and constitute a magnetic flux collecting circuit that serves as a part of a magnetic flux circuit for the magnetic fluxes of the magnetic flux guiding ring 40 magnetized by the permanent magnet 30. Although the magnetic flux collecting circuit is formed by the intermediate yoke 50, the magnetic sensor 60, and the back yoke 70 as described above, such a configuration that the magnetic flux path for the magnetic fluxes of the permanent magnet 30 constitutes a magnetic closed loop circuit with a low magnetic resistance throughout the entire path extending from one of the magnetic poles to the other of the magnetic poles is not positively required. In other words, it is constituted as if the magnetic circuit terminates at the back yoke 70.

By employing such structure, it is possible to detect the changes in the magnetic fluxes passing between the intermediate yoke 50 and the back yoke 70 with no practical issues while simplifying the structure of the entire device. Needless to say, it may be likely that, for example, component parts of the vehicle such as the shaft part 1 happen to constitute a magnetic closed loop circuit.

Further, in this embodiment, as explained above, the intermediate yoke 50, the magnetic sensor 60 and the back yoke 70 are fixed to the vehicle side non-rotatable member 80, independently of the lever member 10 as a first rotatable member and the sprocket 20 as a second rotatable member. This further simplifies the mounting structure. Furthermore, the magnetic sensor side structure is non-rotatable, which causes less problems.

Figure 4A:
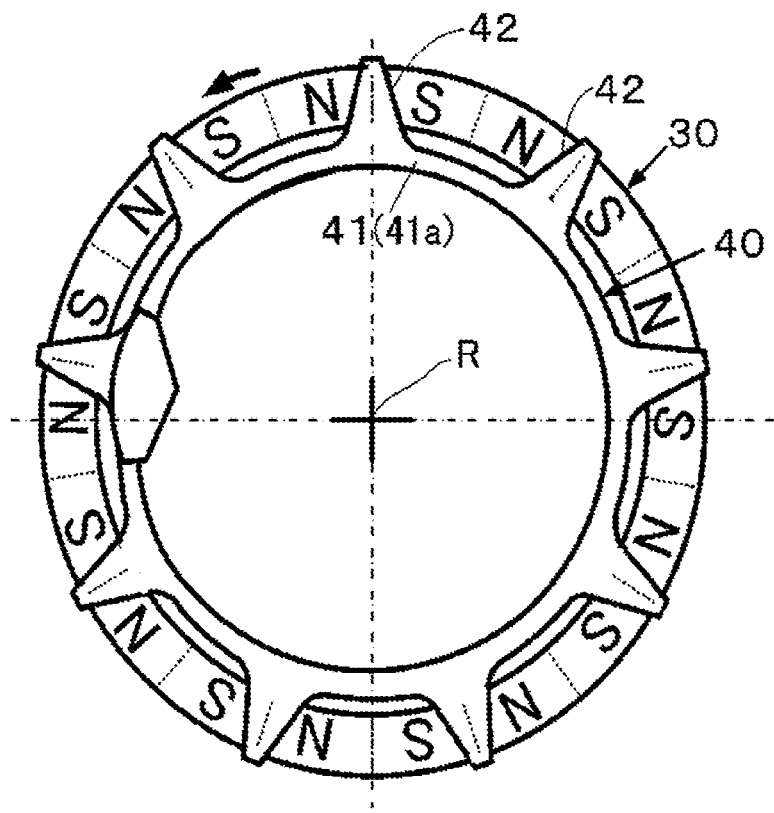
FIG. 4A is an explanatory view showing a positional relation of magnetic poles of a permanent magnet and protruding portions of a magnetic flux guiding ring in the state shown in FIG. 3A.
Figure 5A:
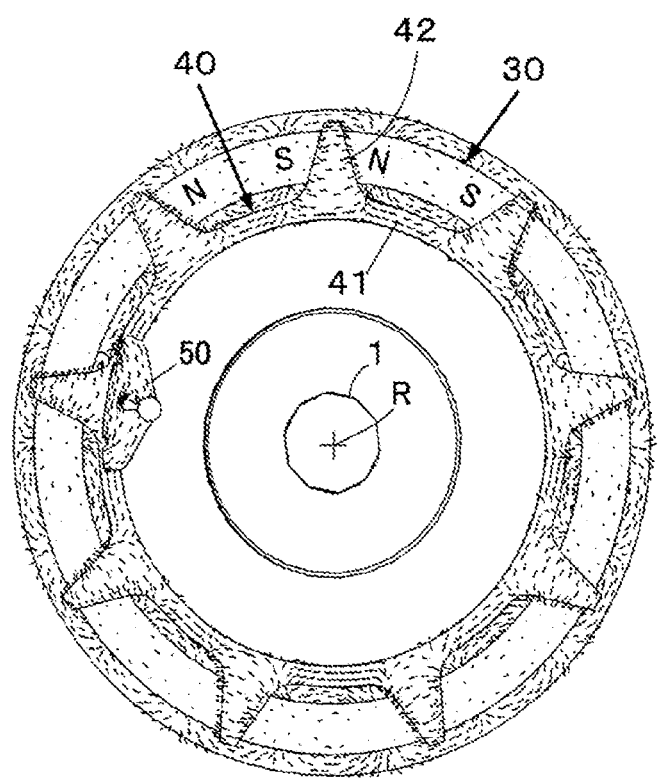
FIG. 5A is an explanatory view showing a magnetic flux distribution of the magnetic poles of the permanent magnet and the magnetic flux guiding ring in the state shown in FIG. 3A.

Next, the operating principle of the relative rotational angular displacement detection device of this embodiment will be explained. FIG. 4A shows an initial state (corresponding to the state shown in FIG. 3A) in which the lever member 10 as a first rotatable member and the sprocket 20 as a second rotatable member are not relatively rotated. In this initial state, each protruding portion 42 of the magnetic flux guiding ring 40 is positioned in between the adjacent magnetic poles of the permanent magnet 30, i.e., positioned between the N-pole and the S-pole. In this initial state, each protruding portion 42 constitutes a magnetic flux circuit of the adjacent N-pole and S-pole as shown in FIG. 5A.

As shown in FIG. 4A, in the initial state, when seen in the axial direction of the shaft part 1, the ring body 41 is positioned such that each protruding portion 42 is positioned between the N-pole and the S-pole and that the overlapping area of the S-pole and the protruding portion 42 and the overlapping area of the N-pole and the protruding portion 42 are equal. Therefore, the ring body 41 is weakly magnetized to N-poles and S-poles alternately in the circumferential direction corresponding the N-poles and the S-poles of the permanent magnet 30. In other words, the ring body 41 maintains a so-called magnetically neutral or almost neutral state (see FIG. 5A).

In the illustrative embodiment, as shown in the figures, the outer peripheral edge of the ring body 41 and the inner peripheral edge of the permanent magnet 30 are set to have a narrow gap therebetween. Therefore, as explained above, although the ring body 41 is weakly magnetized to N-poles and the S-poles alternately in the circumferential direction corresponding to the N-poles and the S-poles of the permanent magnet 30, by increasing the gap, the magnetization state of the ring body 41 becomes further weak, which results in further improved detection accuracy.

Figure 5B:
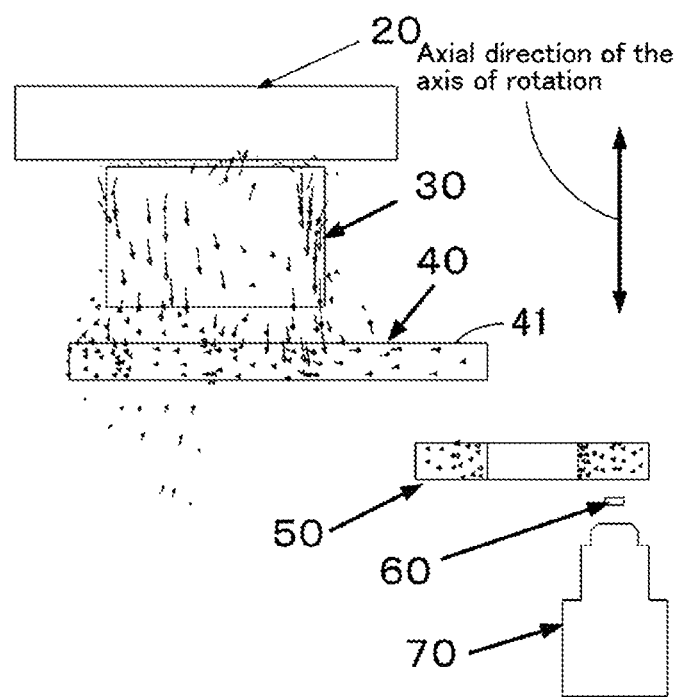
FIG. 5B is an explanatory view showing a magnetic flux distribution of the permanent magnet, the magnetic flux guiding ring, an intermediate yoke, a magnetic sensor, and a back yoke in the state shown in FIG. 3A.
Figure 5C:
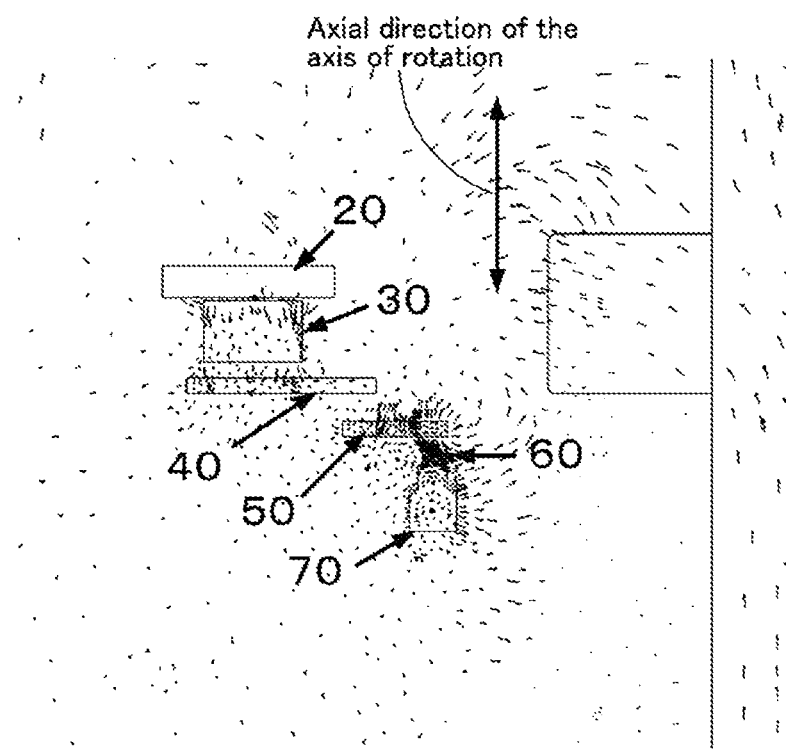
FIG. 5C is an explanatory view showing a magnetic flux distribution of the permanent magnet, the magnetic flux guiding ring, the intermediate yoke, the magnetic sensor, the back yoke and the vicinity thereof in the state shown in FIG. 3A.

Accordingly, in this initial state, the magnetic fluxes flowing from the magnetic flux guiding ring 40 (ring body 41) to the intermediate yoke 50 are very weak, or almost no magnetic flux exists between the magnetic flux guiding ring 40 and the intermediate yoke 50 (see FIGS. 5B and 5C). In this initial state, the magnetic fluxes of the ring body 41 of the magnetic flux guiding ring 40 weakly magnetized to N-poles and S-poles alternately in the circumferential direction are collected by the intermediate yoke 50 and the back yoke 70 which are arranged adjacent to the ring body 41 of the magnetic flux guiding ring 40 and intensively flows through the magnetic sensor 60 arranged between the intermediate yoke 50 and the back yoke 70 (see FIG. 5C). Accordingly, the magnetic sensor 60 can assuredly detect the magnetic fluxes of the ring body 41 of the magnetic flux guiding ring 40.

Figure 6A:
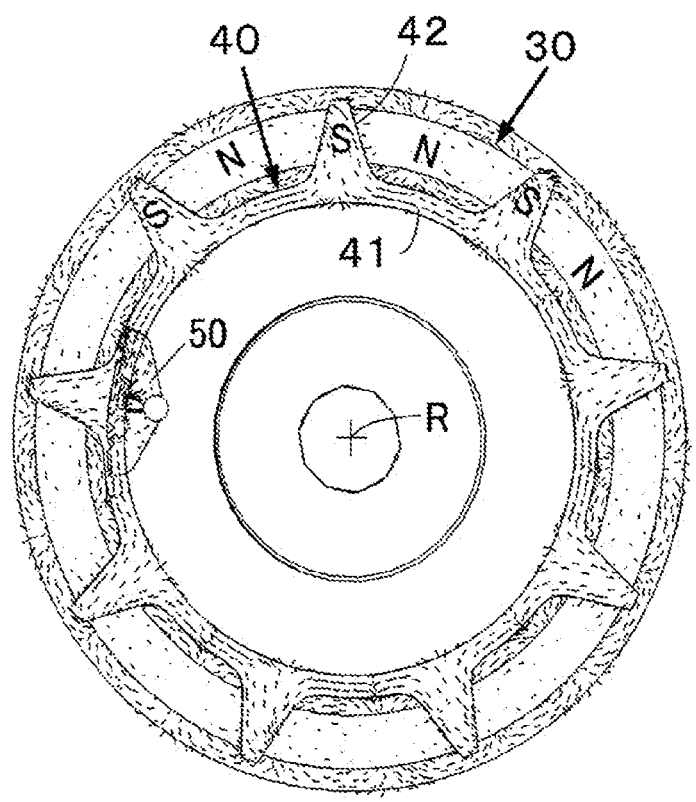
FIG. 6A is an explanatory view showing a magnetic flux distribution of the magnetic poles of the permanent magnet and the magnetic flux guiding ring in the state shown in FIG. 3B.
Figure 6B:
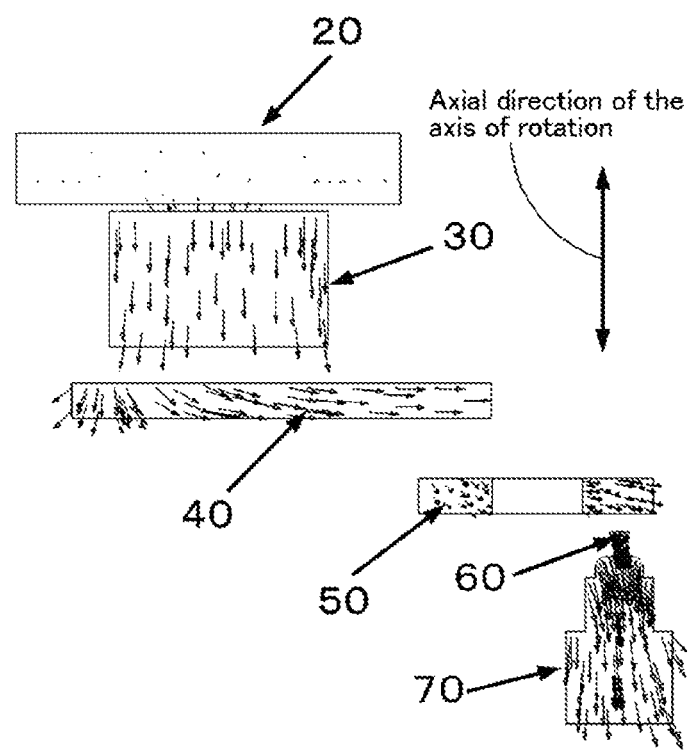
FIG. 6B is an explanatory view showing a magnetic flux distribution of the permanent magnet, the magnetic flux guiding ring, the intermediate yoke, the magnetic sensor, and the back yoke in the state shown in FIG. 3B.

On the other hand, from the aforementioned initial state, when the lever member 10 rotates by a certain angle (10 degrees in this embodiment) in the counterclockwise direction so that each protruding portion 42 of the magnetic flux guiding ring 40 overlaps one of magnetic poles (S-pole in this embodiment) of the permanent magnet 30 when seen in the axial direction, the protruding portion 42 is strongly magnetized to the overlapping magnetic pole (S-pole in this embodiment) (see FIG. 6A). As a result, the ring body 41 of the magnetic flux guiding ring 40 is magnetized to the overlapping magnetic pole (S-pole in this embodiment) of the permanent magnet 30 along the entire circumference.

Figure 6C:
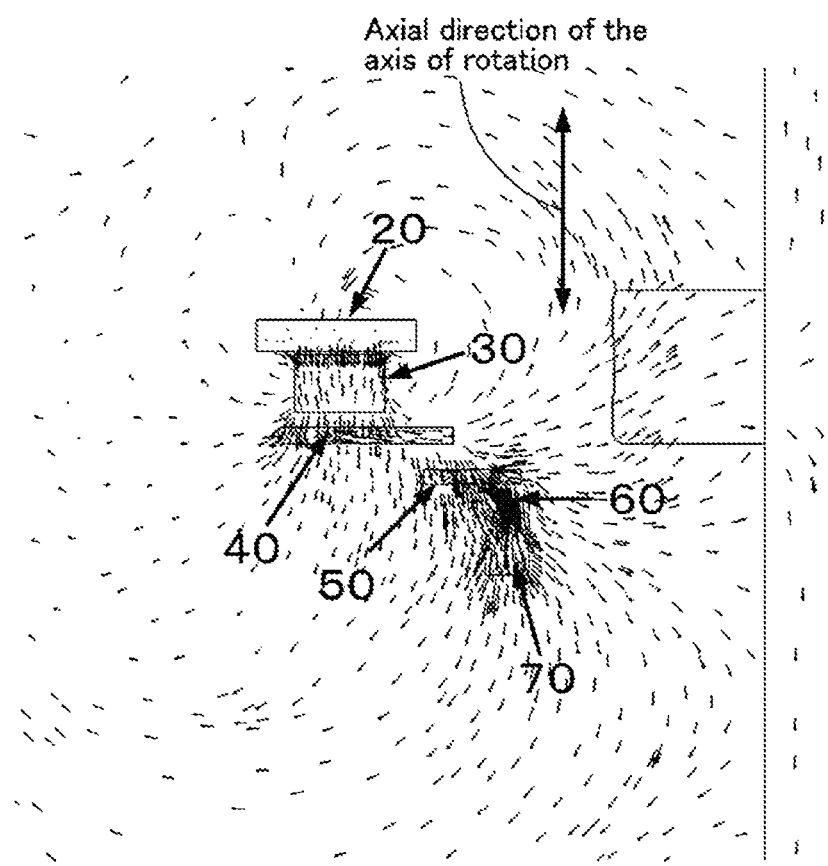
FIG. 6C is an explanatory view showing a magnetic flux distribution of the permanent magnet, the magnetic flux guiding ring, the intermediate yoke, the magnetic sensor, the back yoke and the vicinity thereof in the state shown in FIG. 3B.

Accordingly, the magnet fluxes of the magnetic flux guiding ring 40 magnetized as mentioned above are collected by the intermediate yoke 50 and the back yoke 70 which are arranged adjacent to the magnetic flux guiding ring 40 and intensively flows through the magnetic sensor 60 arranged between the intermediate yoke 50 and the back yoke 70 (see FIG. 6C). As a result, the magnetic sensor 60 can assuredly detect the magnetic fluxes of the ring body 41 of the magnetic flux guiding ring 40 magnetized to one of magnetic poles (S-pole in this embodiment) in the circumferential direction.

As will be understood from the above, by forming the magnetic flux collecting circuit only by the magnetic flux guiding ring 40, the intermediate yoke 50 and the back yoke 70, without positively forming a magnetic closed loop circuit, the displacement of the magnetic fluxes passing through the magnetic flux collecting circuit can be detected by the magnetic sensor 60 in a practically satisfactory manner. As shown in FIGS. 5C and 6C, also in this device, although the permanent magnet 30 forms a magnetic closed loop circuit via the magnetic flux guiding ring 40, the intermediate yoke 50 and the back yoke 70, it is not always required to positively form a magnetic closed loop circuit using members other than the aforementioned members.

The phrase "it is not always required to positively form a magnetic closed loop circuit" means that it is sufficient to positively form a magnetic flux collecting circuit by at least the magnetic flux guiding ring 40, the intermediate yoke 50 and the back yoke 70. In other words, in the present invention, it is not intended to exclude the case in which other vehicle constitutional members, such as, e.g., a shaft part 1 or peripheral members thereof, eventually form a magnetic closed loop circuit together with the magnetic flux guiding ring 40, the intermediate yoke 50, and the back yoke 70. It should be understood that the present invention does not always require to positively form a magnetic closed loop circuit.

Figure 4B:
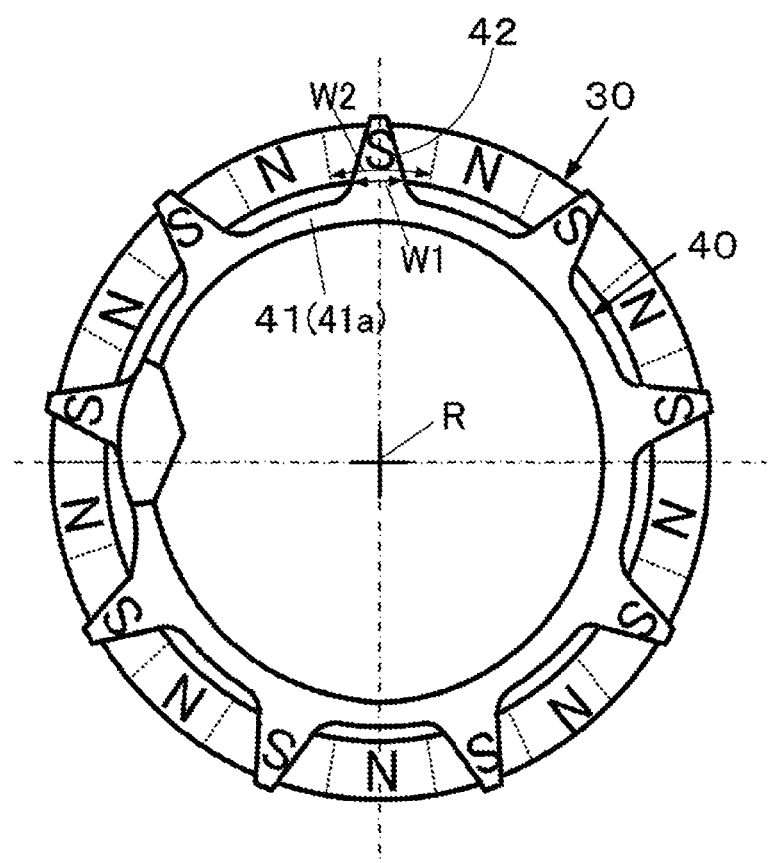
FIG. 4B is an explanatory view showing a positional relation of the magnetic poles of the permanent magnet and the protruding portions of the magnetic flux guiding ring in the state shown in FIG. 3B.

As explained above, the lever member 10 as a first rotatable member and the sprocket 20 as a second rotatable member are structured such that the relative rotational angle between the lever member 10 and the sprocket 20 is changed so that the angle in the state shown in FIGS. 3A and 4A and the angle in the state shown in FIGS. 3B and 4B are different.

When the rotational force given to the pedal P is changed between the state shown in FIG. 3A in which no rotational force is given and the state shown in FIG. 3B in which a rotational force exceeding the biasing force of the spring S is given, the relative rotational angle between the lever member 10 as a first rotatable member and the sprocket 20 as a second rotatable member changes. Along with the change, the magnetization state of the ring body 41 of the magnetic flux guiding ring 40 changes between the so-called magnetically neutral or almost neutral state in which the ring body 41 is weakly magnetized or almost not magnetized along the entire circumference and the state in which the entire ring body 41 is magnetized to a S-pole or a N-pole (S-pole in the embodiment).

As explained above, the magnetic sensor 60 detects the change in the magnetic fluxes depending on the relative rotational angular displacement of the permanent magnet 30 and the magnetic flux guiding ring 40 which corresponds to the rotational force given to the pedal P. Therefore, depending on the change in the detected magnetic fluxes, the relative rotational angular displacement is continuously detected. In this embodiment, since the spring S is mounted, the relative rotational angular displacement of the lever member 10 and the sprocket 20 can be detected, which in turn can detect the relative rotational torque displacement. Therefore, by controlling a power driving means (not illustrated) with a controller (not illustrated) based on the displacement, the rotational force of the pedal P can be assisted. Furthermore, the position and size of the magnetic sensor 60 is such that the magnetic sensor 60 may detect magnetic fluxes of the annular plane portion 41a in the magnetization direction of the permanent magnet 30 among magnetic fluxes of the annular plane portion 41a.

In the aforementioned embodiment, the explanation was made by exemplifying the case in which the lever member 10 as a first rotatable member is displaced relative to the sprocket 20 as a second rotatable member in a counterclockwise direction.

It should be noted, however, that it can be configured such that the lever member 10 as a first rotatable member is displaced relative to the sprocket 20 as a second rotatable member in both directions, i.e., the counterclockwise direction and the clockwise direction. In this case, the direction of the magnet fluxes passing through the magnetic sensor 60 changes depending on the direction of the relative angular displacement of both the rotatable members 10 and 20, i.e., in the clockwise direction or in the counterclockwise direction. Therefore, when an electric motor (not illustrated) as an auxiliary power source is controlled using the output of the magnetic sensor 60 via a control circuit (not illustrated), in a power assist wheelchair for example, not only the forward driving but also the reverse driving can be assisted.

Further, in the aforementioned embodiment, the case in which a coil spring S is used as an elastic member is exemplified. It should be noted, however, that various springs can be utilized and it can be configured to detect the relative rotational angular displacement or the rotational torque of the first and second rotatable members 10 and 20 using other elastic member of various resin or metal, e.g., a torsional dumper, etc.

According to the embodiment of the present invention, the relative rotational angular displacement detection device includes the permanent magnet 30, the magnetic flux guiding ring 40, the intermediate yoke 50, the magnetic sensor 60, and the back yoke 70. The permanent magnet 30 is fixed to one of the pair of rotatable members 10 and 20 and includes S-poles and N-poles magnetized in the axial direction of the shaft part 1 and arranged alternately in the circumferential direction of the shaft part 1.

The magnetic flux guiding ring 40 includes the annular ring body 41 fixed to the other of the pair of rotatable members 10 and 20 and arranged so as not to overlap the permanent magnet 30 when seen in the axial direction of the shaft part 1, and a plurality of protruding portions 42 protruded from the ring body 41 in the radially outward direction of the shaft part 1 and arranged so as to overlap the permanent magnet 30 when seen in the axial direction of the shaft part 1. The number of protruding portions 42 is equal to the number of pairs of magnetic poles. The circumferential width W1 of the protruding portion 42 is smaller than the circumferential width W2 of each magnetic pole.

The intermediate yoke 50 is arranged close to the ring body 41 of the magnetic flux guiding ring 40 to collect the magnetic fluxes of the magnetic flux guiding ring 40 magnetized depending on the relative position of each protruding portion 42 of the magnetic flux guiding ring 40 and each magnetic pole of the permanent magnet 30. The intermediate yoke 50 constitutes a magnetic flux collecting circuit together with the back yoke 70.

The magnetic sensor 60 is arrange between the intermediate yoke 50 and the back yoke 70 and configured to detect the magnetic fluxes passing through the magnetic flux collecting circuit constituted by the intermediate yoke 50 and the back yoke 70.

Therefore, the relative rotational angular displacement detection device can assuredly detect the relative rotational angular displacement of the first rotatable member 10 and the second rotatable member 20 with a simple structure. Further, the relative rotational angular displacement detection device is configured to detect the magnetic fluxes passing through the magnetic flux collecting circuit constituted by the intermediate yoke 50 and the back yoke 70 with the magnetic sensor 60. This further simplifies the structure, the production and the assembly of the device, which in turn can reduce the cost.

Next, a comparison between the first state (FIGS. 3A and 4A) and the second state (FIGS. 3B and 4B) will be given. The strength of magnetization of the magnetic flux guiding ring 40 in the second state is greater than the strength of magnetization of the magnetic flux guiding ring 40 in the first state.

When seen in the direction in which the protruding portions 42 and the permanent magnet 30 face each other, there are overlap regions where the protruding portions 42 overlap the permanent magnet 30, as shown in FIGS. 4A and 4B. The difference between the ratio of the area of overlap regions overlapping one (S-pole) of the poles to the area of all the overlap regions and the ratio of the area of overlap regions overlapping the other (N-pole) of the poles to the area of all the overlap regions in the first state is different from that in the second state. The difference between the ratios in the second state is greater than the difference between the ratios in the first state. For example, in FIG. 4A (an example of the first state), the difference between the ratio (about 50%) of the area of the overlap regions overlapping the S-poles and the ratio (about 50%) of the area of the overlap regions overlapping the N-poles is substantially 0%. In FIG. 4B (an example of the second state), the difference between the ratio (100%) of the area of the overlap regions overlapping the S-poles and the ratio (0%) of the area of the overlap regions overlapping the N-poles is 100%. Thus, in this embodiment, the difference (100%) between the ratios in the second state is greater than the difference (substantially 0%) between the ratios in the first state. The present invention puts no particular limitation to the ratios. The ratios shown in this embodiment are merely illustrative examples of the ratios adoptable in the present invention.

In FIG. 4A (an example of the first state), the magnetic flux guiding ring 40 is magnetized into the N-pole group and S-pole group. The positions of the protruding portions 42 relative to the magnetic poles are such that the difference between the strength of magnetization of the magnetic flux guiding ring 40 magnetized by the N-pole group and the strength of magnetization of the magnetic flux guiding ring 40 magnetized by the S-pole group is small. In FIG. 4B (an example of the second state), the magnetic flux guiding ring 40 is magnetized into the S-pole group. The positions of the protruding portions 42 relative to the magnetic poles are such that the difference between the strength of magnetization of the magnetic flux guiding ring 40 magnetized by the N-pole group and the strength of magnetization of the magnetic flux guiding ring 40 magnetized by the S-pole group is large.

The pair of rotatable members are configured to be rotatable relative to each other in the circumferential direction of the axis of rotation within an angular range of less than one rotation (360 degrees). One of the pair of rotatable members is biased such that it is rotatable in one direction relative to the other of the rotatable members with respect to the circumferential direction of the axis of rotation. That is, the one of the pair of rotatable members is, when a rotational force is given thereto, moved from one end (downstream in the biasing direction) to the other end (upstream in the biasing direction) of the angular range. The one of the pair of rotatable members is, for example, positioned at either one of the one end and the other end of the angular range in the first state and positioned at the other of the one end and the other end of the angular range in the second state.

In this embodiment, the magnetic detection unit includes the intermediate yoke. However, in the present invention, it is not essential that the magnetic detection unit includes the intermediate yoke. In this embodiment, for example, the magnetic sensor is arranged at an interval from the permanent magnet with respect to the axial direction of the axis of rotation. For example, the magnetic sensor is arranged at a position different from the position of the permanent magnet and does not overlap the permanent magnet with respect to the radial direction of the axis of rotation. For example, the magnetic sensor is configured to detect magnetic fluxes emitted from the permanent magnet and inputted to the magnetic sensor in the axial direction.

In this embodiment, the circumferential width of each protruding portion is smaller than the circumferential width of each magnetic pole. However, this example does not limit the present invention. In the present invention, it suffices that the circumferential width of at least one protruding portion is smaller than the circumferential width of at least one magnetic pole.

It should be understood that the terms and expressions used herein are used for explanation and have no intention to be used to construe in a limited manner, do not eliminate any equivalents of features shown and mentioned herein, and allow various modifications falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to."

The present invention can be preferably applied to a relative rotational angular displacement detection device for use in a power assist system for, e.g., a power assist wheelchair, a power assist bicycle, a power steering wheel, etc., to detect a relative rotational angular displacement of a pair of rotatable members relatively rotatable in the circumferential direction of a rotation shaft. The present invention can also be preferably applied to a torque detection device or a torque control device including the detection device.

The invention claimed is:

1. A relative rotational angular displacement detection device, comprising:
    a pair of rotatable members rotatable relative to each other about an axis of rotation in a circumferential direction;
    a permanent magnet attached to one of the pair of rotatable members and including magnetic poles magnetized in an axial direction of the axis of rotation, the magnetic poles being arranged so as to alternate in polarity in the circumferential direction, the magnetic poles each having a circumferential width;
    a magnetic flux guiding ring including
        an annular ring body, the annular ring body being attached to the other of the pair of rotatable members and arranged coaxially with the axis of rotation, the annular ring body including an annular plane portion that extends in a direction intersecting with the axial direction of the axis of rotation,
        a plurality of protruding portions each having a circumferential width, the plurality of protruding portions protruding from the annular ring body toward one side with respect to radial directions radiating from the axis of rotation, the plurality of protruding portions being arranged so as to partially overlap the permanent magnet when seen in the axial direction of the axis of rotation,
        each respective protruding portion of at least one of the plurality of protruding portions being configured such that the circumferential width of the respective protruding portion, at a portion thereof that overlaps an edge of the permanent magnet at an other side with respect to one of the radial directions, is smaller than the circumferential width of one of the magnetic poles of the permanent magnet at an edge of the one magnetic pole at the other side when seen in the axial direction of the axis of rotation,
        the annular ring body being magnetized with a strength of magnetization changing depending on positions of the protruding portions relative to positions of the magnetic poles; and
    a magnetic detection unit facing one surface of the annular ring body with a gap therebetween with respect to the axial direction of the axis of rotation, the magnetic detection unit being configured to detect magnetic fluxes of the annular plane portion from the one surface of the annular ring body, wherein
    the annular ring body is formed of a single piece.

2. The relative rotational angular displacement detection device as recited in claim 1, wherein
    each of the protruding portions has a tapered shape with the circumferential width thereof decreasing.

3. The relative rotational angular displacement detection device as recited in claim 1, wherein
    each of the protruding portions extends outward in a respective radial direction of the radial directions.

4. The relative rotational angular displacement detection device as recited in claim 1, wherein
   the relative rotational angular displacement detection device is configured to detect the magnetic fluxes by the magnetic detection unit without positively forming a magnetic closed loop circuit.

5. The relative rotational angular displacement detection device as recited in claim 1, wherein the magnetic detection unit includes a magnetic sensor for detecting magnetic fluxes oriented in the axial direction of the axis of rotation among magnetic fluxes of the annular plane portion.

6. The relative rotational angular displacement detection device as recited in claim 5, wherein at least one of the annular ring body and the magnetic sensor is arranged at a position different from the positions of the protruding portions with respect to the axial direction of the axis of rotation.

7. The relative rotational angular displacement detection device as recited in claim 6,
   wherein the magnetic detection unit includes an intermediate yoke having a first plane portion, and
   further wherein the first plane portion is arranged between the magnetic sensor and the annular ring body and arranged so as to face the annular plane portion of the annular ring body with a gap therebetween with respect to the axial direction of the axis of rotation.

8. The relative rotational angular displacement detection device as recited in claim 7, wherein a surface area of the first plane portion is smaller than a surface area of the annular plane portion.

9. The relative rotational angular displacement detection device as recited in claim 7,
   wherein at least one of the annular ring body, the intermediate yoke and the magnetic sensor is arranged at a position different from the positions of the protruding portions with respect to the radial directions of the axis of rotation.

10. The relative rotational angular displacement detection device as recited in claim 1, wherein
    the magnetic poles form an N-pole group and an S-pole group,
    the magnetic flux guiding ring has a first state in which the strength of magnetization is relatively low and a second state in which the strength of the magnetization is relatively high compared to the first state,
    in the first state, the protruding portions are positioned relative to the magnetic poles to have a first difference between a strength of magnetization of the magnetic flux guiding ring magnetized by the N-pole group and a strength of magnetization of the magnetic flux guiding ring magnetized by the S-pole group,
    in the second state, the protruding portions are positioned relative to the magnetic poles to have a second difference between the strength of magnetization of the magnetic flux guiding ring magnetized by the N-pole group and the strength of the magnetization of the magnetic flux guiding ring magnetized by the S-pole group, the second difference being larger than the first difference.

11. The relative rotational angular displacement detection device as recited in claim 10, wherein
    in the first state, the protruding portions are positioned relative to the magnetic poles such that the magnetic flux guiding ring is magnetized substantially equally by the N-pole group and the S-pole group,
    in the second state, the protruding portions are positioned relative to the magnetic poles such that the magnetic flux guiding ring is magnetized by substantially only one of the N-pole group and the S-pole group.

12. A torque detection device comprising:
    the relative rotational angular displacement detection device as recited in claim 1; and
    an elastic member arranged between the pair of rotatable members, the elastic member configured to constantly apply a biasing force in a relative rotation direction to the pair of rotatable members,
    wherein the pair of rotatable members is provided with a relative rotation restriction part,
    the relative rotation restriction part being configured to prevent rotation of the rotatable members relative to each other after a first of the pair of rotatable members is rotated relative to a second of the rotatable members through a predetermined rotational angle against the biasing force of the elastic member.

13. A torque control device comprising:
    the relative rotational angular displacement detection device as recited in claim 1;
    a rotation driving member connected to a first of the pair of rotatable members, the rotation driving member configured such that a user gives a rotational force thereto;
    a power source configured to give a rotational force to a second of the rotatable members; and
    a control unit configured to, when the first rotatable member is rotated relative to the second rotatable member through a predetermined rotational angle, control the rotational force that the power source gives to the second rotatable member depending on an output of the magnetic detection unit.

14. A power assist wheelchair comprising the torque control device as recited in claim 13.

15. A power assist straddle-type vehicle comprising the torque control device as recited in claim 13.

16. A power steering device comprising the torque control device as recited in claim 13.

17. The relative rotational angular displacement detection device as recited in claim 1, wherein each of the protruding portions has a tapered shape so that the circumferential width thereof decreases in a direction perpendicular to the axis of rotation.

18. The relative rotational angular displacement detection device as recited in claim 1, further includes a shaft, an axis of which being the axis of rotation.

19. A relative rotational angular displacement detection device, comprising:
    a pair of rotatable members rotatable relative to each other in a circumferential direction around an axis of rotation;
    a permanent magnet attached to one of the rotatable members and including magnetic poles arranged so as to alternate in polarity in the circumferential direction, the magnetic poles each having a circumferential width;
    a magnetic flux guiding ring including
       an annular ring body being attached to the other of the pair of rotatable members and arranged coaxially with the axis of rotation, the annular ring body including an annular plane portion,
       a plurality of protruding portions each having a circumferential width, the plurality of protruding portions protruding from the annular ring body in protruding directions each perpendicular to the axis of rotation, the plurality of protruding portions being arranged so as to partially overlap the permanent magnet when seen in an axial direction of the axis of rotation, when seen in the axial direction, each respective protruding portion of the protruding portions being configured such that a portion of the respective protruding portion overlaps a part of one of the poles of the permanent magnet and the circumferential width of the respective protruding portion at the portion is less than the circumferential width of the one magnetic pole at the part, the annular ring body being magnetized with a strength of magnetization changing depending on positions of the protruding portions relative to positions of the magnetic poles; and a magnetic detection unit facing one surface of the annular ring body with a gap therebetween along the axial direction, the magnetic detection unit being configured to detect magnetic fluxes of the annular plane portion from the one surface, wherein the annular ring body is formed of a single piece.

20. The relative rotational angular displacement detection device as recited in claim 19, wherein each of the protruding portions has a tapered shape so that the circumferential width thereof decreases in one of the protruding directions.

* * * * *